No. 723,970. PATENTED MAR. 31, 1903.
W. M. ZITT.
NON-CONDUCTING COVERING.
APPLICATION FILED MAY 12, 1898.

NO MODEL.

UNITED STATES PATENT OFFICE.

WILLIAM M. ZITT, OF CHICAGO, ILLINOIS, ASSIGNOR TO THE McCONNELL ASBESTOS COMPANY, LIMITED, OF PITTSBURG, PENNSYLVANIA, A LIMITED PARTNERSHIP OF PENNSYLVANIA, CONSISTING OF JOHN A. McCONNELL AND ELLSWORTH MURPHY, OF ALLEGHENY, PENNSYLVANIA, AND SAMUEL N. MURPHY AND CHARLES E. MURPHY, OF BURNETT, PENNSYLVANIA.

NON-CONDUCTING COVERING.

SPECIFICATION forming part of Letters Patent No. 723,970, dated March 31, 1903.

Application filed May 12, 1898. Serial No. 680,514. (No specimens.)

*To all whom it may concern:*

Be it known that I, WILLIAM M. ZITT, a resident of Chicago, in the county of Cook and State of Illinois, (post-office address, General Delivery, Chicago, Illinois,) have invented a new and useful Improvement in Non-Conducting Coverings; and I do hereby declare the following to be a full, clear, and exact description thereof.

My invention relates to non-conducting coverings for insulating steam pipes and boilers and for all other purposes where a covering of heat-insulating material is desired to arrest the radiation of heat from any heated surface.

My invention consists, generally stated, in a non-conducting covering the principal element of which is magnesium hydrate.

Figure 1:
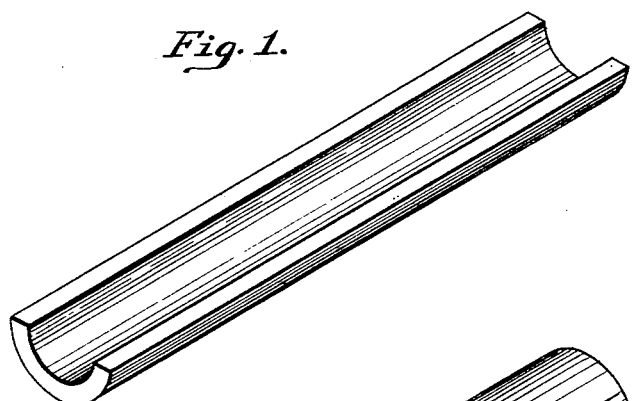
Figure 2:
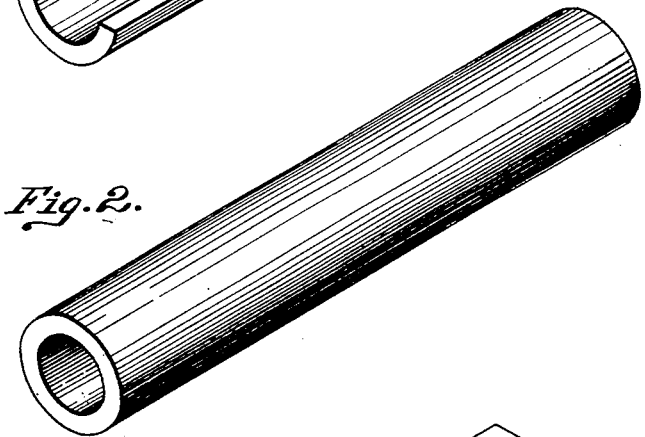
Figure 3:
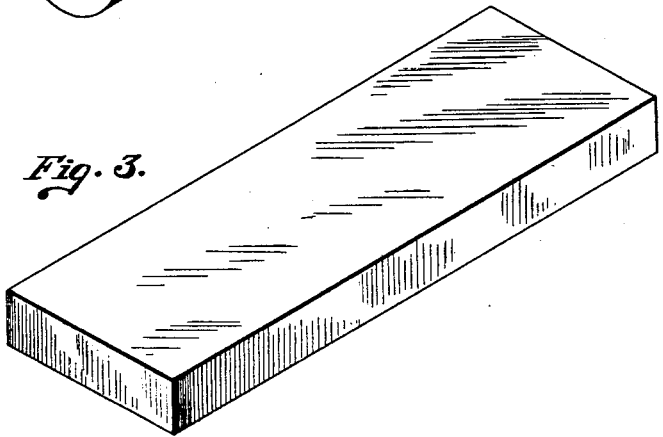

In the accompanying drawings, Figure 1 is a perspective view of a non-conducting covering in semicircular form to be applied to steam-pipes or like rounded surfaces. Fig. 2 is a like view of such a covering in tubular form. Fig. 3 is a like view of a stave or block.

In the practice of my invention I first take magnesite, calcine it, and reduce it to a pulverulent state. I do not wish to be understood, however, as limiting myself to the use of magnesite, as I may employ other mineral containing magnesia in sufficient quantities. The proportions of the ingredients depend on the nature of the product desired and the purpose for which it is to be employed. By way of illustration I may take one hundred parts of the pulverulent magnesia and introduce it into a vessel containing from four hundred to five hundred parts water. I prefer to employ a closed vessel. To the mixture of pulverized magnesia and water I add fifteen parts of carbonate of ammonium. After the introduction of the carbonate of ammonium I prefer to agitate the mixture. After the introduction of the carbonate of ammonium swelling and setting of the magnesia begins to take place, so absorbing the water as to form a gelatinous mass. The agitation seems to assist this swelling and setting action.

The chemical reactions that take place when ammonia or the following salts of ammonium are mixed with magnesia suspended in water are shown from chemical analysis of the finished product to be as follows:

$$MgO + NH_4OH = Mg(OH)_2 + NH_3.$$
$$2MgO + (NH_4)_2CO_3 = MgCO_3 + Mg(OH)_2 + 2NH_3.$$
$$2MgO + (NH_4)_2SO_4 = MgSO_4 + Mg(OH)_2 + 2NH_3.$$
$$2MgO + 2NH_4Cl = MgCl_2 + Mg(OH)_2 + 2NH_3.$$

As seen from the equations given, the purpose of the ammonia is to rapidly hydrate the magnesia. In the case of a salt of ammonium the acid of that salt—carbonic, sulfuric, hydrochloric, &c.—is at the same time transferred to the magnesia, ammonia being liberated. In practice I use no more ammonia or salt of ammonium as compared to magnesia than the above reactions require, thus insuring the presence of magnesium hydrate.

The hydration of the magnesia takes place so rapidly that a large volume of water is temporarily held, thereby insuring to the dried product an apparent volume equal to all the water originally present. The water, therefore, is the mold that determines by its volume the volume of the hydrated mass and, like any other mold, requires a certain amount of material to fill it. If the material is lacking, part of the mold will be empty. The mixture in this gelatinous or pasty condition is introduced into molds of the proper form for producing shapes like those shown in the figures of the drawings or any other desired shapes. Before the mixture is introduced into the molds I prefer to add to it asbestos fiber, which adds to the strength and produces elasticity.

By introducing the mixture directly into the molds while in a soft and plastic state and before it has thoroughly set the chemical union is still going on while in the mold and the particles adhere more firmly to each other, and thus form a strong bond, which gives the covering greater strength and durability than any magnesia covering heretofore made. By this process a complete chemical union is effected, thus forming each piece into a strong homogeneous mass. The mixture in this state is then allowed to dry, so as to retain the shape of the mold or other receptacle containing it. To facilitate this drying operation, the molds are placed in a suitable drying-kiln and subjected to heat. During this drying operation the free ammonia is expelled. The final product, therefore, is magnesium hydrate, together with the salt of magnesia, corresponding to the salt of ammonium used where a salt is employed.

While I have referred to the use of carbonate of ammonium, I do not wish to limit myself thereto; but I wish to include within the scope of my invention the use of ammonia broadly, whether in the form of aqua ammonia, the salts of ammonium, the compounds of ammonium, or ammonia-gas.

The action of the ammonium carbonate in addition to hastening hydration is to transform some of the magnesia into carbonate of magnesia. The chemical reaction which takes place has been given above.

The process may be conducted at any temperature from that of the ordinary atmosphere to a high temperature. Variations in temperature, however, affect the nature of the finished product. Volume and lightness increase with the temperature. Strength decreases. Hence if it is desired to produce a light voluminous product without regard to strength the mixture is highly heated. On the other hand, if strength of product is desired at the expense of lightness and volume the operations are conducted at a lower temperature, or if it is desired to apply this non-conducting covering in the form of plastic cement I first pulverize the magnesite and ammonium salt and then add the asbestos fiber or other suitable material, thoroughly mixing all together in a dry state. This mixture in its dry state may be packed in barrels or other closed receptacles to prevent the waste of ammonia, and in this condition it may be transported to the place where the material is to be used. To prepare the mixture for application to the pipe or other object to be insulated, I add water to the mixture and agitate it, whereupon the process of hydration throughout the mass begins, and while this process is still going on the plastic mass may be applied to the surface to be insulated. The process of hydration forms a chemical union between the particles of the mass in the manner already described, and thus forms a strong permanent covering on the surface to be insulated. In view of this last-mentioned manner of applying the covering it is apparent that the applying of the plastic mass directly to the object to be insulated instead of first molding it to the form of the object to be insulated is clearly the equivalent of said molding operation.

The magnesium hydrate contains about twenty-eight (28) per cent. water of combination or fixed water, and consequently if the covering is exposed to water or dampness no injury is done to the same. The water will not have the effect of disintegrating the magnesium hydrate, and consequently it will hold together. This is of great advantage where the covering is placed in tunnels or underground passages where dampness prevails. Most coverings when exposed to water or dampness will disintegrate, and the particles when separated will drop off.

What I claim as my invention, and desire to secure by Letters Patent, is—

1. As a new article of manufacture, a non-conducting covering formed of a light voluminous body containing as its principal element magnesium hydrate.

2. A non-conducting covering containing magnesium hydrate, and a salt of magnesia, the magnesium hydrate predominating.

3. A non-conducting covering containing magnesium hydrate, and magnesium carbonate, the magnesium hydrate predominating.

4. As a new article of manufacture, a molded non-conducting covering formed of a light voluminous body containing as its principal element magnesium hydrate, said covering being molded while in process of hydration.

In testimony whereof I, the said WILLIAM M. ZITT, have hereunto set my hand.

WILLIAM M. ZITT.

Witnesses:
 ALFRED L. MORRIS,
 WILLIAM A. JEROME.